United States Patent [19]

Domicone et al.

[11] 3,911,998

[45] Oct. 14, 1975

[54] PROTECTIVE COATING FOR BETA-SPODUMENE REGENERATORS

[75] Inventors: Joseph J. Domicone, Horseheads; Charles J. Parker, Painted Post, both of N.Y.

[73] Assignee: Corning Glass Works, Corning, N.Y.

[22] Filed: Aug. 3, 1973

[21] Appl. No.: 385,566

[52] U.S. Cl. ............... 165/10; 427/387; 427/430; 428/447
[51] Int. Cl.[2] ..... B05D 3/02; B05D 1/18; B32B 9/04
[58] Field of Search .............. 117/123 C, 123 D; 1/161 ZA; 106/39.7; 165/10; 264/60; 427/387, 430; 428/447

[56] References Cited
UNITED STATES PATENTS

| | | | |
|---|---|---|---|
| 2,733,592 | 2/1956 | Burchead et al.................. | 117/123 |
| 3,052,590 | 9/1962 | Maros et al........................ | 117/161 |
| 3,076,726 | 2/1963 | Auld et al.......................... | 117/161 |
| 3,112,184 | 11/1963 | Hollenbach....................... | 264/286 |
| 3,477,869 | 11/1969 | Butler et al. ...................... | 117/123 |
| 3,681,122 | 8/1972 | Domicone et al. ................ | 117/161 |
| 3,691,512 | 9/1972 | Exner................................ | 117/123 |

*Primary Examiner*—William D. Martin
*Assistant Examiner*—Sadie L. Childs
*Attorney, Agent, or Firm*—Kees van der Sterre; Clinton S. Janes, Jr.; Clarence R. Patty, Jr.

[57] ABSTRACT

Beta-spodumene ceramic articles such as gas turbine regenerators are rendered more resistant to attack by moist sulfur oxide-containing gases such as the exhaust gases from certain hydrocarbon combustion processes by providing a protective coating of a silicone fluid or a silicone resin thereon.

3 Claims, No Drawings

PROTECTIVE COATING FOR BETA-SPODUMENE REGENERATORS

BACKGROUND OF THE INVENTION

U.S. Pat. No. 3,112,184 to Hollenbach describes the manufacture of thin-walled ceramic articles of honeycomb structure, useful as regenerators, radiators, catalyst carriers, filters and the like. These structures are fabricated from essentially any sinterable ceramic material by a process comprising applying a suspension of pulverized ceramic material and a binder to a flexible sheet carrier, corrugating the coated carrier and forming it into an article of the desired shape, and finally firing the article to sinter the pulverized ceramic material into a unitary structure.

Ceramic honeycomb structures composed principally of beta-spodumene have been used commercially as regenerators (heat exchangers) for gas turbine engines. Beta-spodumene is a crystalline lithium aluminosilicate demonstrating good high temperature stability and a low coefficient of thermal expansion. Ceramic honeycomb structures fabricated from beta-spodumene and beta-spodumene solid solutions, whether by the method of Hollenbach or any other suitable means, provide regenerators and other heat resistant articles offering a very desirable combination of properties.

In a typical gas turbine regenerator application, the regenerator is in the form of a large thick disc or wheel positioned across the intake and exhaust ports of the gas turbine engine with channels across its thickness through which the intake and exhaust gases flow. In operation, the wheel is continuously rotated so that regions heated by the exiting exhaust gases are thereafter interposed across the intake port to heat incoming air for the combustion process. In this way, both the heating of the intake air and the cooling of the exhaust gases are simultaneously accomplished.

The increasing use of beta-spodumene-containing regenerators in applications of this type has revealed that the beta-spodumene crystal structure is not entirely stable under thermal cycling conditions in the presence of sulfur-containing exhaust gases from hydrocarbon combustion processes. More specifically, it has been found that, at temperatures in excess of about 400°F (200°C.), exhaust gases containing water vapor in combination with the oxides of sulfur can interact with beta-spodumene-containing ceramic materials to cause permanent dimensional changes and modifications in thermal expansion behavior which destroy the useful properties of these materials for high temperature and temperature cycling applications.

In the case of gas turbine regenerator wheels, interaction between the exhaust gases and the beta-spodumene phase results in a type of failure known as mid-radius cracking, wherein radial cracks appear in the circular face of the regenerator in the region between the center and the rim. It has been determined that this harmful interaction occurs principally near the cold face of the regenerator, i.e., that face away from the exiting exhaust gases which is first contacted by intake air. This face of the regenerator remains at a lower average temperature than the surface nearest the exhaust. Mid-radius cracking is thought to result from permanent changes in the thermal expansion behavior and density of the beta-spodumene ceramic material in the cold face region. Types of failure other than mid-radius cracking may of course be induced in other types of beta-spodumene bodies by the sulfur oxide-water-spodumene interaction depending upon the nature of the body and the particular application for which it is employed.

It is the principal object of the present invention to provide a means of protecting beta-spodumene ceramic articles from the adverse effects of contact with sulfur-containing exhaust gases from hydrocarbon combustion processes.

It is a further object to provide beta-spodumene articles to be used in high temperature and temperature cycling applications as heat exchangers and the like which are resistant to attack by sulfur-containing exhaust gases.

SUMMARY OF THE INVENTION

We have discovered that these and other objects may be attained by applying to the portions of the beta-spodumene article to be protected a silicone coating consisting of a silicone oil or resin. This protective silicone coating is provided by applying the silicone fluid or resin to selected portions of the article to be protected and thereafter heating the article to a temperature suitable for curing the silicone resin or fluid to form the desired protective coating.

Among the ceramic articles which may be usefully treated according to the invention are articles wherein beta-spodumene or a beta-spodumene solid solution constitutes the principal crystalline phase (at least about 90% by volume of the article). Other phases which may be present in minor amounts depending upon the exact composition of the article and the manner in which it is made include cristobalite, quartz, mullite, titania, zirconia and the like.

The presence of protective silicone coatings in accordance with the present invention has been found to markedly improve the resistance of beta-spodumene ceramic regenerator wheels to the corrosive effects of exhaust gases containing sulfur oxides and water vapor in the temperature range of maximum corrosion in the turbine engine.

DETAILED DESCRIPTION

Chemical analysis of samples taken from beta-spodumene regenerators which have seen service in turbine engines indicates that the source of the instability of beta-spodumene in the exhaust environment is the loss of lithium from the crystal phase. Thus, whereas the original spodumene material contains about 4–5% $Li_2O$ by weight, investigation reveals that up to about 40% of this lithia may be extracted from certain cold face regions of a regenerator after as little as 2000 hours of service. This removal of lithium from the beta-spodumene structure produces a drastic change in the thermal expansion behavior and density of the ceramic material in the cold face regions of the regenerator. In contrast, the hot face regions of such a regenerator, which operate at temperatures above the range where substantial corrosion occurs, exhibit negligible lithium extraction and normal thermal behavior and density. It is this difference in properties between cold and hot face regions of the regenerator which is thought to produce cracking failure.

The extraction of lithium from beta-spodumene regenerator wheels which occurs in service in a turbine engine may be reproduced in the laboratory by passing a hot gas stream containing $SO_2$ or $SO_3$ and water vapor over a sample structure. The most active agent attacking the beta-spodumene structure is probably condensed $H_2SO_3$ or $H_2SO_4$, which is believed to extract $Li^+$ ions from the crystal structure of the material according to a reaction such as:

$$Li_2O \cdot Al_2O_3 \cdot XSiO_2 + H_2SO_4$$
$$H_2O \cdot Al_2O_3 \cdot XSiO_2 + Li_2SO_4$$

Thus the extent of attack can be determined from the amount of lithium sulfate on the surface of a sample after treatment or from the proportion of residual $Li_2O$ remaining in the beta-spodumene structure.

We have found that protective coatings consisting essentially of a silicone selected from the group consisting of silicone fluids and silicone resins provide substantial protection from the effects of moist sulfur-oxide containing exhaust gases when applied to cold face regions of beta-spodumene regenerator wheels. The substantial protection afforded by these silicone coatings is somewhat surprising in view of the fact that the operating temperatures encountered are well above the accepted use temperatures of these materials. Hence, the breakdown of dimethyl silicone fluids in the presence of air commences at about 392°F. (200°C.). In addition, these fluids are subject to depolymerization by concentrated sulfuric acid, particularly at elevated temperatures, and are subject to polymerization in the presence of minor amounts of dilute sulfuric acid. In the case of silicone resins, the generally recognized maximum continuous use temperature of non-metallized silicone resin films is about 482°F. (250°C.). On the other hand, the temperature range of maximum effect for sulfur corrosion in the regenerator of a turbine engine is about 400°–650°F., such temperatures being typical of the cold face and near-cold face environment. Nevertheless, deterioration of the spodumene structure as measured by the extraction of lithium therefrom is significantly reduced in silicone-protected cold face regions even at these elevated temperatures.

Silicone fluids and resins suitable for providing protective coatings according to the invention are commercially available. Useful silicone fluids include the Dow Corning 200 Fluids, which are dimethyl silicone fluids available in a wide selection of viscosities from the Dow Corning Corporation, Midland, Michigan. Dimethyl silicones having viscosities in the range of about 20–1000 centistokes at 25°C. are particularly useful in the preparation of coatings, although fluids of higher viscosity may be employed if desired. Silicone fluids containing phenyl groups as well as methyl groups may also be employed. In all cases, however, it is preferred that the selected silicone fluid be thinned with a volatile solvent such as toluene, xylene, or the chlorinated solvents in order to provide a very thin protective coating on the beta-spodumene ceramic. Unthinned silicones produce coatings of excessive thickness from the standpoint of both cost and effectiveness. Solutions containing only about 5–15% by weight of silicone fluid in a suitable solvent are particularly preferred. Such solutions may be applied by dipping, spraying or other conventional application technique to selected regions of a beta-spodumene ceramic article and the resulting silicone coating may then be cured by heating the coated article to temperatures in the range of about 400°–575°F. for times in the range of about 1–3 hours.

Higher curing temperatures may be used provided the curing time is short.

Suitable silicone resins for the purposes of the present invention include the protective coating resins manufactured by the Dow Corning Corporation, including DC-804, DC-801, DC-802, DC-803, DC-805, DC-806 and DC-808. DC-804 resin is high in dimethyl silicone polymers and is preferred. These resins are supplied in the form of xylene or toluene solutions which contain about 50–60% resin solids by weight. The resins as supplied commercially are too viscous for easy application as a thin coating to a beta-spodumene ceramic honeycomb regenerator, and are therefore preferably thinned with compatible volatile solvents. Suitable solvents include chlorinated solvents, glycol ethers, and aromatic hydrocarbon solvents. Solutions consisting of 5–15% of the commercially supplied resin in a xylene or toluene solvent are preferred for ease of handling and application.

Suitable alternative resins include silicone varnishing resins such as DC-993 or DC-996 and silicone laminating resins such as DC-2103, DC-2104 and DC-2106.

Application of the thinned resin to the beta-spodumene ceramic article to be protected may be accomplished by dipping, spraying, or other conventional technique. Both the silicone resins and the silicone fluids previously described may be applied under vacuum conditions to insure penetration of the silicone resins and the silicone fluids previously described may be applied under vacuum conditions to insure penetration of the silicone into the pore structure of the ceramic material.

Following application of the silicone resin to the article as a coating, the coating may be cured by heating the coated article to a temperature in the range of about 400°–500°F. for a time in the range of about 1–3 hours. Shorter, higher temperature curing treatments may be employed if desired.

The effectiveness of protective silicone coatings produced according to the invention in retarding spodumene attack by moist sulfur oxide-containing gases at elevated temperatures is shown by the following examples.

EXAMPLE I

Samples consisting of sections cut from a beta-spodumene honeycomb regenerator wheel, typically of about 1 inch × 1 inch × ⅝ inch dimensions, are selected for treatment. The regenerator from which the samples are cut is composed of Corning Code 9455 glass-ceramic, a material consisting principally of beta-spodumene but also containing minor amounts of mullite.

A number of the cut samples are provided with protective coatings of DC-804, a silicone resin commercially available from Dow Corning Corporation. These protective coatings are provided by immersing the honeycomb samples in a solution consisting of 5.6% DC-804 silicone resin and the remainder xylene by weight for about one minute at room temperature, removing the samples and shaking to remove excess solution, and finally baking the samples at 400°F. (204°C.) for 3 hours to dry and cure the coating.

Two honeycomb samples, one protected with DC-804 deposited from the silicone resin solution and the other unprotected, are selected for further treatment. Each sample is tested for stability against attack by moist sulfur oxide-containing gases according to a procedure wherein each is placed in a tube furnace reactor, heated to 300°C. (572°F.), and subjected to a constant flow of a test gas consisting of 20% $SO_2$ and the remainder water vapor-saturated air by volume for an interval of 19 hours. Finally the samples are cooled to room temperature and examined.

The extent of attack on the beta-spodumene structure of each sample is directly proportional to the amount of lithium salts formed on the surface of the sample as the result of the spodumene-water-sulfur oxide interaction. These salts are removed by washing and quantitatively analyzed for lithium by flame photometry, with the amount of lithium present being reported on the oxide basis as micrograms of $Li_2O$ extracted per gram of sample weight.

Carrying out the testing procedure described above, it is found that the unprotected sample loses about 325 micrograms of $Li_2O$ per gram of sample weight as the result of sulfur oxide-water attack, while the protected sample loses only about 13 micrograms of $Li_2O$ per gram of sample weight under identical test conditions. Over a 48-hour exposure period under identical test conditions, a similarly protected honeycomb sample loses only about 39 micrograms of $Li_2O$ per gram of sample weight.

EXAMPLE II

The testing procedure of Example I is repeated with a similar pair of samples, but the temperature of the reaction environment is raised to 400°C. Over a test period of 19 hours at 400°C. in the presence of flowing $SO_2$ and water vapor, an unprotected sample loses about 948 micrograms of $Li_2O$ per gram of sample weight, while a resin-protected sample loses only about 276 micrograms of $Li_2O$ per gram of sample weight. Continued exposure of resin-protected samples to identical test conditions for periods up to 48 hours produce losses of about 497 micrograms of $Li_2O$ per gram of sample weight.

Similar levels of corrosion protection under test conditions similar to these described above are provided by protective silicone resin coatings deposited from solutions containing 15% by weight of DC-804 resin.

EXAMPLE III

A number of beta-spodumene honeycomb samples similar to those described in Example I are provided with a protective coating consisting essentially of a silicone fluid. The coating is provided by immersing the honeycomb samples in a solution consisting of 5% Dow Corning 200 Fluid and the remainder xylene by weight for several minutes under vacuum at room temperature, removing the samples and shaking to remove excess solution, and heating the samples first at 400°F. for 3 hours and then at 572°F. for one-half hour to dry and cure the silicone coating. The Dow Corning 200 Fluid employed is a dimethyl silicone fluid having a viscosity of 350 centistokes at 25°C.

A beta-spodumene honeycomb sample having no protective coating and a similar sample having a protective silicone coating composed of Dow Corning 200 Fluid produced as described are tested for stability against attack by moist sulfur oxide-containing gases according to the procedure described in Example I.

After exposure for 19 hours to a flowing mixture of $SO_2$ and water vapor-saturated air at 300°C., the unprotected sample loses 325 micrograms of $Li_2O$ per gram of sample weight while the silicone-protected sample loses about 84 micrograms of $Li_2O$ per gram of sample weight. A similar silicone-protected sample loses 98 micrograms of $Li_2O$ per gram of sample weight upon exposure for 87 hours to identical test conditions.

EXAMPLE IV

A pair of beta-spodumene samples similar to the pair tested in Example I, consisting of an unprotected honeycomb section and a section protected by a silicone resin coating composed of DC-804 silicone resin, are selected for treatment. These samples are tested according to the procedure described in Example I, except that they are placed in small platinum foil boats prior to insertion into the tube furnace reactor. Under these conditions sample corrosion is somewhat increased because some of the $SO_2$ in the flowing furnace atmosphere is oxidized to $SO_3$ in the presence of the platinum foil.

Over an exposure interval of 19 hours at 300°C. under the conditions described, an unprotected beta-spodumene honeycomb sample loses about 6340 micrograms of $Li_2O$ per gram of sample weight, while a sample protected by a DC-804 silicone resin coating loses about 143 micrograms of $Li_2O$ per gram of sample weight.

EXAMPLE V

A pair of beta-spodumene samples similar to the pair tested in Example III, consisting of an unprotected honeycomb section and a section protected by a cured coating of Dow Corning 200 silicone fluid, are selected for treatment. These samples are placed on platinum foil boats and subjected to the test procedure described in Example IV above.

After 19 hours at 300°C. under the conditions described, the unprotected sample loses about 6340 micrograms of $Li_2O$ per gram of sample weight, whereas the sample protected with Dow Corning 200 fluid loses only about 207 micrograms of $Li_2O$ per gram of sample weight.

Example VI

As previously noted, attack by exhaust gases containing water vapor and sulfur oxides can induce permanent dimensional changes in beta-spodumene materials. The effectiveness of silicone coatings in protecting against such permanent dimensional changes is tested with three beta-spodumene honeycomb samples, each about ½ inch × ½ inch × 3 inches in size, cut from a honeycomb regenerator wheel such as described in Example I. One sample is provided with a protective coating composed of DC-804 silicone resin according to the procedure described in EXample I, and a second sample is provided with a coating consisting of Dow Corning 200 silicone fluid according to the procedure described in Example III. The third sample is left unprotected.

All samples are carefully measured in the 3 inch dimension and placed in tube furnace reactors where they are heated to 300°C. and subjected to a flowing gas mixture consisting of about 13% $SO_3$ and the remainder water-vapor-saturated air by volume for 3 hours.

After exposure to moist $SO_3$-containing gas at 300°C. for 3 hours, it is found that the unprotected sample exhibits a length change of about +400 ppm as the result of treatment. In contrast, the DC-804 silicone resin-protected sample exhibits a length change of +193 ppm and the Dow Corning 200 silicone fluid-protected sample a length change of +142 ppm after identical periods of exposure.

From the data presented above in Examples I–VI it is apparent that protective coatings consisting essentially of a silicone resin or fluid provide a useful means for improving the resistance of beta-spodumene ceramic articles to attack by moist sulfur-oxide-containing atmospheres even at temperatures in excess of 400°F. Thus our invention may be employed to increase the service life of ceramic regenerators or other beta-spodumene ceramic articles exposed to sulfur-containing exhaust gases of fossil fuel combustion processes.

We claim:

1. A beta-spodumene ceramic gas turbine regenerator wheel demonstrating improved resistance to attack by exhaust gases containing sulfur oxides and water vapor at temperatures in the range of about 400°–650°F. having on at least a portion thereof a protective coating consisting essentially of a cured silicone selected from the group consisting of silicone fluids and silicone resins.

2. A beta-spodumene ceramic regenerator wheel according to claim 1 wherein the protective coating consists essentially of a cured dimethyl silicone fluid.

3. A beta-spodumene ceramic regenerator wheel according to claim 2 wherein the protective coating consists essentially of a cured silicone resin.

* * * * *